(12) United States Patent
Kiapour et al.

(10) Patent No.: US 10,885,394 B2
(45) Date of Patent: *Jan. 5, 2021

(54) FINE-GRAINED CATEGORIZATION

(71) Applicant: eBay Inc., San Jose, CA (US)

(72) Inventors: Mohammadhadi Kiapour, San Francisco, CA (US); Wei Di, San Jose, CA (US); Vignesh Jagadeesh, Santa Clara, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,367

(22) Filed: Mar. 28, 2019

(65) Prior Publication Data

US 2019/0266451 A1    Aug. 29, 2019

Related U.S. Application Data

(63) Continuation of application No. 15/788,115, filed on Oct. 19, 2017, now Pat. No. 10,282,642, which is a
(Continued)

(51) Int. Cl.
*G06K 9/00*    (2006.01)
*G06K 9/62*    (2006.01)
(Continued)

(52) U.S. Cl.
CPC ....... *G06K 9/6276* (2013.01); *G06K 9/00979* (2013.01); *G06K 9/3216* (2013.01);
(Continued)

(58) Field of Classification Search
CPC .. G06K 9/6276; G06K 9/6857; G06K 9/6256; G06K 9/4628; G06K 9/3241;
(Continued)

(56) References Cited

U.S. PATENT DOCUMENTS 642,987 A    2/1900  Hviid
6,009,197 A  12/1999  Riley
(Continued)

FOREIGN PATENT DOCUMENTS

CN    102567736 A    7/2012
CN    103443816 A    12/2013
(Continued)

OTHER PUBLICATIONS

Office Action received for Korean Patent Application No. 10-2017-7023101, dated Feb. 20, 2019, 4 pages.
(Continued)

*Primary Examiner* — Amir Alavi
(74) *Attorney, Agent, or Firm* — Schwegman Lundberg & Woessner, P.A.

(57) ABSTRACT

An image is passed through an image identifier to identify a coarse category for the image and a bounding box for a categorized object. A mask is used to identify the portion of the image that represents the object. Given the foreground mask, the convex hull of the mask is located and an aligned rectangle of minimum area that encloses the hull is fitted. The aligned bounding box is rotated and scaled, so that the foreground object is roughly moved to a standard orientation and size (referred to as calibrated). The calibrated image is used as an input to a fine-grained categorization module, which determines the fine category within the coarse category for the input image.

20 Claims, 9 Drawing Sheets

Related U.S. Application Data continuation of application No. 14/967,876, filed on Dec. 14, 2015, now Pat. No. 9,818,048.

(60) Provisional application No. 62/105,110, filed on Jan. 19, 2015.

(51) Int. Cl.
  *G06K 9/32* (2006.01)
  *G06K 9/68* (2006.01)
  *G06Q 30/00* (2012.01)
  *G06K 9/46* (2006.01)

(52) U.S. Cl.
  CPC ......... *G06K 9/3241* (2013.01); *G06K 9/6229* (2013.01); *G06K 9/6256* (2013.01); *G06K 9/6857* (2013.01); *G06Q 30/00* (2013.01); *G06K 9/4628* (2013.01)

(58) Field of Classification Search
  CPC ............... G06K 9/3216; G06K 9/6229; G06K 9/00979; G06Q 30/00
  See application file for complete search history.

(56) References Cited

U.S. PATENT DOCUMENTS

| | | | |
|---|---|---|---|
| 6,429,875 | B1 | 8/2002 | Pettigrew et al. |
| 7,917,519 | B2* | 3/2011 | Kimbrough ........... G06F 16/353 707/749 |
| 8,351,668 | B2* | 1/2013 | Naini .................. G06T 7/64 382/128 |
| 9,818,048 | B2* | 11/2017 | Kiapour ............... G06K 9/3241 |
| 10,250,642 | B2* | 4/2019 | Ferrara .................. H04L 63/20 |
| 10,282,642 | B2* | 5/2019 | Kiapour ............... G06K 9/6229 |
| 10,387,773 | B2* | 8/2019 | Yan .......................... G06N 3/04 |
| 2003/0011303 | A1 | 1/2003 | Matthies et al. |
| 2003/0058257 | A1 | 3/2003 | Yin |
| 2003/0113035 | A1 | 6/2003 | Cahill et al. |
| 2007/0081712 | A1 | 4/2007 | Huang et al. |
| 2010/0329582 | A1 | 12/2010 | Albu et al. |
| 2011/0167068 | A1* | 7/2011 | Kimbrough ........... G06F 16/353 707/740 |
| 2012/0095982 | A1 | 4/2012 | Lennington et al. |
| 2013/0044127 | A1 | 2/2013 | Wu et al. |
| 2014/0107846 | A1* | 4/2014 | Li ........................... G05B 15/02 700/275 |
| 2014/0118402 | A1 | 5/2014 | Gallo et al. |
| 2015/0169993 | A1* | 6/2015 | Rabinovich ............. G06F 16/51 382/224 |
| 2016/0036860 | A1* | 2/2016 | Xing .................... G06F 21/6227 726/1 |
| 2016/0117587 | A1* | 4/2016 | Yan .......................... G06N 3/08 706/20 |
| 2016/0196653 | A1 | 7/2016 | Grant et al. |
| 2016/0210533 | A1 | 7/2016 | Kiapour et al. |
| 2016/0217576 | A1 | 7/2016 | Kabus et al. |
| 2016/0217577 | A1 | 7/2016 | Tom et al. |
| 2016/0266451 | A1* | 9/2016 | Koide ............... G02F 1/136286 |
| 2018/0039866 | A1 | 2/2018 | Kiapour et al. |

FOREIGN PATENT DOCUMENTS

| | | |
|---|---|---|
| CN | 107592839 A | 1/2018 |
| WO | 2016/118332 A1 | 7/2016 |

OTHER PUBLICATIONS

Office Action received for Korean Patent Application No. 10-2017-7023101, dated Sep. 12, 2018 , dated Sep. 12, 2018, 12 pages.
Response to Office Action filed on Nov. 12, 2018 for Korean Patent Application No. 10-2017-7023101, dated Sep. 12, 2018, 28 pages.
Non-Final Office Action received for U.S. Appl. No. 14/967,876, dated Feb. 27, 2017, 11 pages.
Notice of Allowance received for U.S. Appl. No. 14/967,876, dated Jul. 14, 2017, 8 pages.
Response to Non-Final Office Action filed on Apr. 16, 2017 for U.S. Appl. No. 14/967,876, dated Feb. 27, 2017, 9 pages.
Extended European Search Report received for European Patent Application No. 16740497.9, dated May 23, 2018, 6 pages.
Response to European Search Report filed on Dec. 5, 2018 for European Patent Application No. 16740497.9, dated May 23, 2018, 14 pages.
Office Action received for Chinese Patent Application No. 201680016969.5, dated Oct. 24, 2018, 19 pages.
Response to Office Action filed on Feb. 27, 2019, for Chinese Patent Application No. 201680016969.5, dated Oct. 24, 2018, 16 pages.
Fukushima, "Neocognitron: A Self-organizing Neural Network Model for a Mechanism of Pattern Recognition Unaffected by Shift in Position", Biol. Cybernetics 36, 1980, pp. 193-202.
Gaves, et al., "Local Alignments for Fine-Grained Categorization", Retrieved from the internet link: URL<https://link.springer.com/article/10.1007/s11263-014-0741-5>, Jul. 19, 2014, pp. 191-212.
Hernandez, et al., "Spatio-Temporal GrabCut human segmentation for face and pose recovery", Computer Vision and Pattern Recognition Workshops (CVPRW), IEEE, Jun. 2010, 8 pages.
Juneja et al., "Blocks That Shout: Distinctive Parts for Scene Classification", Jun. 23, 2013, pp. 3555-3559.
Kiapour, "Mine the Fine: Fine-Grained Fragment Discovery", Sep. 27, 2015, pp. 3555-3559.
Krizhevsky et al., "ImageNet Classification with Deep Convolutional Neural Networks", 2012, 9 pages.
Merck et al., "A Methodology for Constructing Geometric Priors and Likelihoods for Deformable Shape Models", UNC Chapel Hill Tectmical Report, 2006, 9 pages.
Navarro et al., "Indexing Methods for Approximate String Matching", IEEE (Bulletin of the IEEE Computer Society Technical Committee on Date Engineering), 2001, pp. 1-9.
Parkhi et al., "Cats and Dogs", Jun. 16, 2012, pp. 3498-3505.
Parkhi et al., "The Truth About Cats and Dogs", Nov. 6, 2011, pp. 1427-1434.
International Preliminary Report on Patentability received for PCT Application No. PCT/US2016/012522, dated Aug. 3, 2017, 7 pages.
International Search Report received for PCT Application No. PCT/US2016/012522, dated Mar. 17, 2016, 2 pages.
Written Opinion received for PCT Application No. PCT/US2016/012522, dated Mar. 17, 2016, 5 pages.
Rother et al., "GrabCut—Interactive Foreground Extraction using Iterated Graph Cuts", ACM Transactions on Graphics, 2004, pp. 309-314.
Singh et al., "Unsupervised Discovery of Mid-Level Discriminative Patches", ECCV'12 Proceedings of the 12th European conference on Computer Vision—vol. Part II, Oct. 2012, pp. 73-86.
Tsai et al., "Combining Image and Text Features: A Hybrid Approach to Mobile Book Spine Recognition", MM '11 Proceedings of the 19th ACM international conference on Multimedia, 2011, pp. 1029-1032.
Jijlings et al., "Selective Search for Object Recognition", International Journal of Computer Vision, 2012, pp. 1-14.
Yamaguchi et al., "Parsing Clothing in Fashion Photographs", IEEE Conference on Computer Vision and Pattern Recognition, 2012, pp. 3570-3577.
Notice of Allowance received for Korean Patent Application No. 10-2017-7023101, dated Jul. 26, 2019, 5 pages (2 pages of English Translation and 3 pages of Official Copy).
Communication Pursuant to Article 94(3) EPC received for European Patent Application No. 16740497.9, dated Jun. 25, 2019, 3 pages.
Office Action received for Chinese patent Application No. 201680016969.5, dated Jul. 1, 2019, 17 pages (7 pages official copy and 10 pages English translation).
Response to Office Action filed on Sep. 6, 2019, for Chinese Patent Application No. 201680016969.5, dated Jul. 1, 2019, 10 pages (5 pages of Official copy & 5 pages of English Translation of claims).

(56) References Cited

OTHER PUBLICATIONS

Office Action received for Korean Patent Application No. 10-2019-7031355, dated Nov. 17, 2019, 10 pages (6 pages official copy and 4 pages English translation).
Response to Office Action filed on Jan. 17, 2020, for Korean Patent Application No. 10-2019-7031355, dated Nov. 17, 2019, 17 pages (14 pages of Official copy & 3 pages of English translation of claims).
Final Office Action received for U.S. Appl. No. 15/788,115, dated Oct. 22, 2018, 9 pages.
Non-Final Office Action received for U.S. Appl. No. 15/788,115 dated Apr. 5, 2018, 16 pages.
Notice of Allowance received for U.S. Appl. No. 15/788,115, dated Dec. 17, 2018, 8 pages.
Preliminary Amendment for U.S. Appl. No. 15/788,115, filed Oct. 23, 2017, 8 pages.
Response to Final Office Action filed on Nov. 29, 2018 for U.S. Appl. No. 15/788,115, dated Oct. 22, 2018, 8 pages.
Response to Non-Final Office Action filed on Jul. 2, 2018 for U.S. Appl. No. 15/788,115, dated Apr. 5, 2018, 15 pages.
Response to Office Action filed on Apr. 19, 2019 for Korean Patent Application No. 10-2017-7023101, dated Feb. 20, 2019, 8 pages (2 pages of English Translation and 6 pages of Official Copy).

\* cited by examiner

FINE-GRAINED CATEGORIZATION

PRIORITY CLAIM

The application is a continuation of and claims the benefit of priority of U.S. application Ser. No. 15/788,115, filed Oct. 19, 2017, which is a continuation of and claims the benefit of priority of U.S. application Ser. No. 14/967,876, filed Dec. 14, 2015, which claims the benefit of priority of U.S. Provisional Patent Application No. 62/105,110, filed Jan. 19, 2015, each of which is hereby incorporated by reference in its entirety.

TECHNICAL FIELD

The subject matter disclosed herein generally relates to the use of deep convolutional neural networks for classifying data.

BACKGROUND

A deep convolutional neural network (CNN) can be used to classify images based on items shown in the images. For a certain level of training, CNNs have a finite discriminatory capacity. In a typical dataset, orientation of items varies between images and the discriminatory capacity of the resulting CNNs may be spent on being able to recognize the class of an item without regard to orientation. Accordingly, CNNs have difficulty in recognizing subtle differences between similar types of items.

BRIEF DESCRIPTION OF THE DRAWINGS

Some embodiments are illustrated, by way of example and not limitation, in the figures of the accompanying drawings.

DETAILED DESCRIPTION

Example methods and systems are directed to fine-grained image classification. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details. A properly configured computer system controls the process of find-grained image classification. For descriptive purposes, the process is broken into steps performed by various modules or applications.

An image identifier operates on an image of an object to identify a coarse category for the image and a bounding box for the categorized object. The image identifier may be a convolutional neural network (CNN), a support vector machine (SVM), or any suitable combination thereof. For a particular image having an identified object in a coarse category, a mask (e.g., a grabCut mask) is used to identify the portion of the image that represents the object. From the foreground mask, the convex hull of the object is located and a rotated rectangle of minimum area that encloses the hull is fitted. This rotated rectangle is termed the aligned bounding box. The aligned bounding box is rotated and scaled to form a calibrated image, so that the foreground object is roughly moved to a standard orientation and size in the calibrated image.

The calibrated image is used as an input to a fine-grained categorization module, which determines the fine-grained category within the coarse category for the input image. For example, coarse categories might be "cars" and "birds." A fine-grained category provides additional detail over the coarse category of a particular image or object. For example, fine-grained categories for the coarse category of "cars" might be makes or models of cars. As another example, fine-grained categories for the coarse category of "birds" might be individual species of birds. Thus, in an example embodiment, once an image is identified as depicting a bird and processed to generate a calibrated image of the depicted bird, the calibrated image is fed to a fine-grained categorization module that determines the species of the depicted bird.

Figure 1:
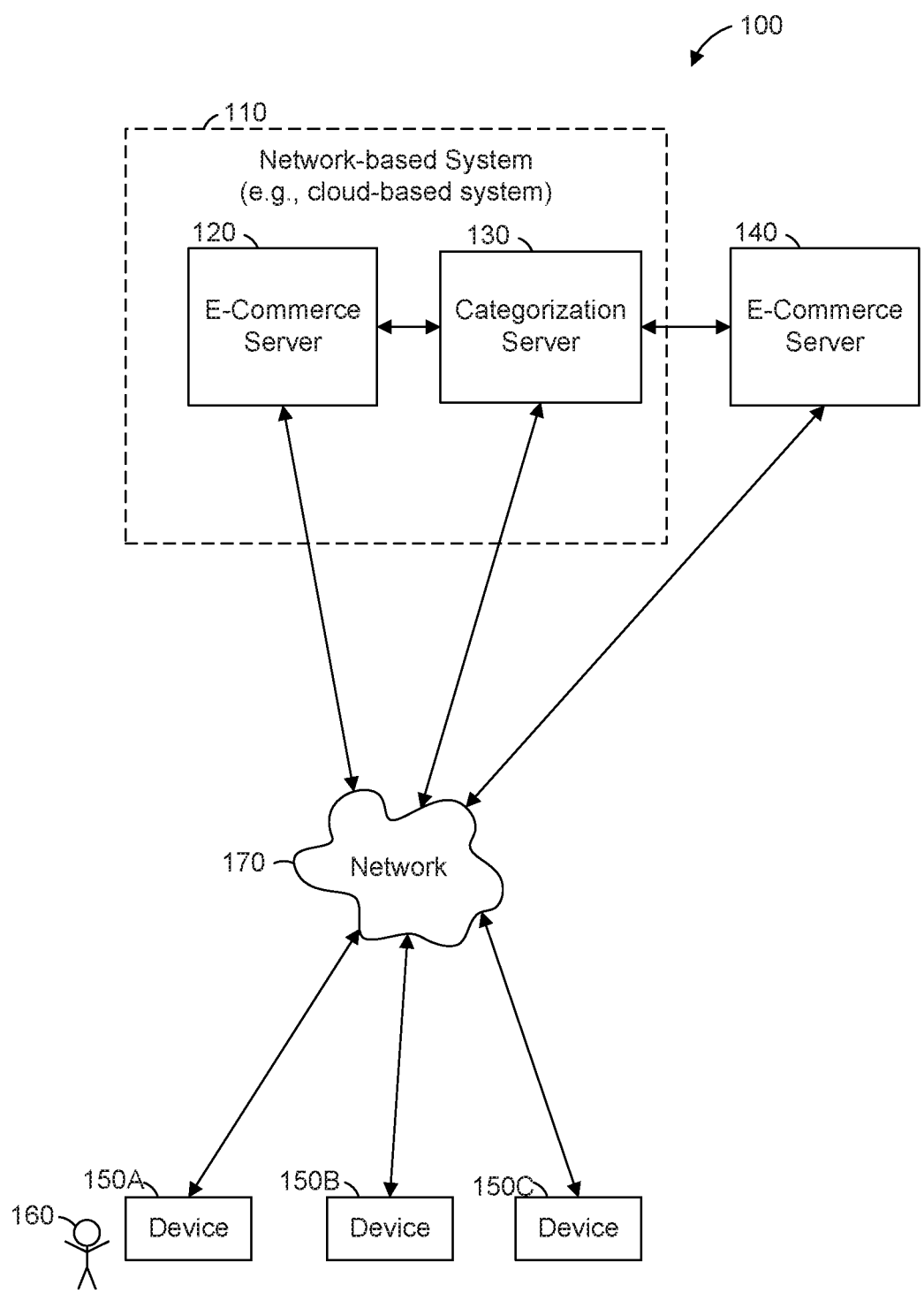
FIG. 1 is a network diagram illustrating a network environment suitable for fine-grained image classification, according to some example embodiments.

FIG. 1 is a network diagram illustrating a network environment 100 suitable for fine-grained image classification, according to some example embodiments. The network environment 100 includes e-commerce servers 120 and 140, a categorization server 130, and devices 150A, 150B, and 150C, all communicatively coupled to each other via a network 170. The devices 150A, 150B, and 150C may be collectively referred to as "devices 150," or generically referred to as a "device 150." Alternatively, the devices 150 may connect to the categorization server 130 directly or over a local network distinct from the network 170 used to connect to the e-commerce server 120 or 140. The e-commerce servers 120 and 140, the categorization server 130, and the devices 150 may each be implemented in a computer system, in whole or in part, as described below with respect to FIGS. 8-9.

The e-commerce servers 120 and 140 provide an electronic commerce application to other machines (e.g., the devices 150) via the network 170. The e-commerce servers 120 and 140 may also be connected directly to, or integrated with, the categorization server 130. In some example embodiments, one e-commerce server 120 and the categorization server 130 are part of a network-based system 110, while other e-commerce servers (e.g., the e-commerce server 140) are separate from the network-based system 110. The electronic commerce application may provide a way for users to buy and sell items directly to each other, to buy from and sell to the electronic commerce application provider, or both.

The categorization server 130 determines a fine-grained category for an input image. The categorization server 130 may provide data to other machines (e.g., the e-commerce servers 120 and 140 or the devices 150) via the network 170 or another network. The categorization server 130 may receive data from other machines (e.g., the e-commerce servers 120 and 140 or the devices 150) via the network 170 or another network. In some example embodiments, the functions of the categorization server 130 described herein are performed on a user device, such as a personal computer, tablet computer, or smart phone.

Also shown in FIG. 1 is a user 160. The user 160 may be a human user (e.g., a human being), a machine user (e.g., a computer configured by a software program to interact with the devices 150 and the categorization server 130), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the categorization server 130 receives data regarding an item of interest to the user 160. For example, a camera attached to the device 150A can take an image of an item the user 160 wishes to sell and transmit the image over the network 170 to the categorization server 130. The categorization server 130 categorizes the item based on the image. The category can be sent to the e-commerce server 120 or 140, to the device 150A, or any combination thereof. The category can be used by the e-commerce server 120 or 140 to aid in generating a listing of the item for sale. Similarly, the image may be of an item of interest to the user 160, and the category can be used by the e-commerce server 120 or 140 to aid in selecting listings of items to show to the user 160.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 8-9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the categorization server 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
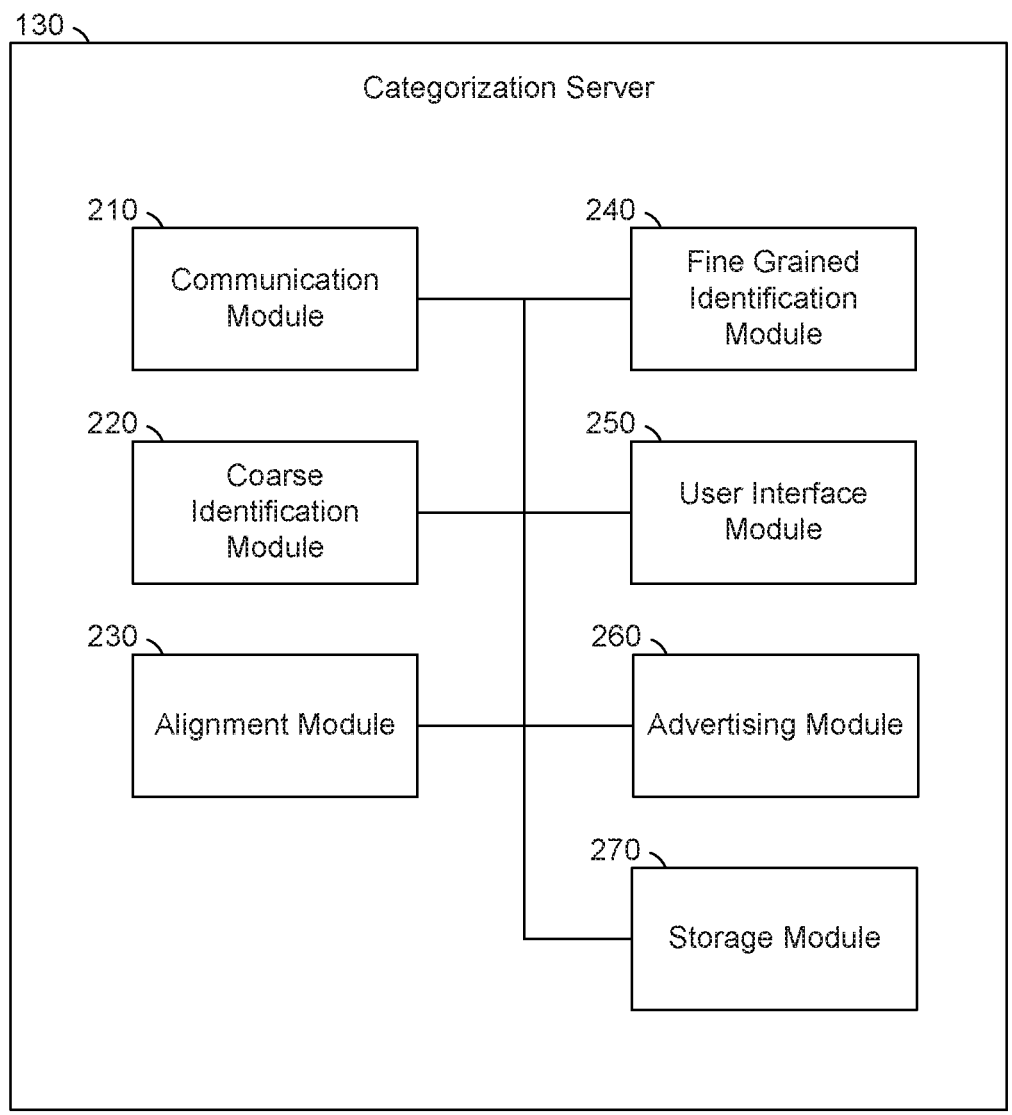
FIG. 2 is a block diagram illustrating components of a categorization server suitable for fine-grained image classification, according to some example embodiments.

FIG. 2 is a block diagram illustrating components of the categorization server 130, according to some example embodiments. The categorization server 130 is shown as including a communication module 210, a coarse identification module 220, an alignment module 230, a fine-grained identification module 240, a user interface (UI) module 250, an advertising module 260, and a storage module 270 all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive image data over the network 170 and send the received data to the coarse identification module 220. As another example, the fine-grained identification module 240 may identify a category for an item, and the category for the item may be transmitted by the communication module 210 over the network 170 to the e-commerce server 140, or directly or through a different network to the e-commerce server 120.

The coarse identification module 220 is configured to identify one or more coarse categories for a given image. In some example embodiments, a CNN, an SVM, or any suitable combination thereof is used to provide the coarse categorization of the image.

The alignment module 230 is configured to identify an aligned bounding box for an object in the categorized image and rotate the portion of the image encompassed by the aligned bounding box for input to the fine-grained identification module 240. In some example embodiments, the aligned bounding box is determined by taking an unaligned bounding box, treating the pixels within the unaligned bounding box as probably part of an object, and treating the pixels outside of the unaligned bounding box as not part of the object. In some example embodiments, the unaligned bounding box is aligned with the image rather than the object. The unaligned bounding box may be defined by the user or generated by the coarse identification module 220.

In some example embodiments, the grabCut algorithm (described in "*GrabCut*"—*Interactive Foreground Extraction using Iterated Graph Cuts*, Rother et al. SIGGRAPH (2004)) is used to further classify pixels within the unaligned bounding box as not part of the object. In other example embodiments, other algorithms are used to distinguish between the object and the background. For example, pixels at the center of the unaligned bounding box may be identified as foreground pixels. The color of adjacent pixels may be compared to the color of the foreground pixels. If the difference in colors is below a threshold, the adjacent pixels are categorized as also being part of the foreground. Otherwise, the adjacent pixels are categorized as being part of the background. The process is repeated until an outer boundary of the area of foreground pixels is found. In some example embodiments, all pixels in the unaligned bounding box having a luminance above a threshold are categorized as foreground pixels.

After identifying the portion of the image within the unaligned bounding box containing the object, an aligned bounding box containing the object is created that is aligned with the shape of the object. In some example embodiments, the aligned bounding box is generated by finding the smallest rectangle containing all pixels in the smallest convex hull containing all identified pixels in the object.

The aligned bounding box is rotated by the alignment module 230 to an orientation expected by the fine-grained identification module 240. For example, if the coarse category is "birds," the fine-grained identification module 240 may be configured (e.g., by being trained) to perform fine discrimination between images of birds where the image has its longest edge vertical and the bird's head is facing toward the top of the image. Accordingly, the aligned bounding box is rotated to align the longest edge with the vertical axis.

The fine-grained identification module 240 is configured to identify the fine category of the object for which the prepared image was created by the alignment module 230. In some example embodiments, the fine-grained identification module 240 is implemented using a CNN, a hierarchical deep CNN (HD-CNN), or any suitable combination thereof. The fine-grained identification module 240 may have been trained using only positive examples having a certain orientation. This training may allow for finer discrimination between similar objects by not using any discriminatory power to compensate for rotation.

The UI module 250 is configured to cause a user interface to be presented on one or more of the devices 150A-150C. For example, the UI module 250 may be implemented by a web server providing hypertext markup language (HTML) files to a device 150 via the network 170. The user interface may present the image received by the communication module 210, the aligned bounding boxes generated by the alignment module 230, fine categories identified by the fine-grained identification module 240, additional data regarding the identified categories, advertising selected by the advertising module 260, or any suitable combination thereof. The user interface may also present listings of items for sale (e.g., listings retrieved from the e-commerce server 120 or 140).

The advertising module 260 is configured to retrieve advertisements relevant to fine categories identified by the fine-grained identification module 240. For example, if the image includes a pair of running shoes, the advertising module 260 may retrieve an advertisement for the running shoes themselves, advertisements for substitute items such as other shoes, advertisements for complementary items such as socks, or any suitable combination thereof.

The storage module 270 is configured to store and retrieve data generated and used by the coarse identification module 220, the alignment module 230, the fine-grained identification module 240, the UI module 250, and the advertising module 260. For example, information regarding categorization of an image, generated by the fine-grained identification module 240, can also be stored by the storage module 270. The e-commerce server 120 or 140 can request the fine category for an image (e.g., by providing an image identifier) which can be retrieved from storage by the storage module 270 and sent over the network 170 using the communication module 210.

Figure 3:
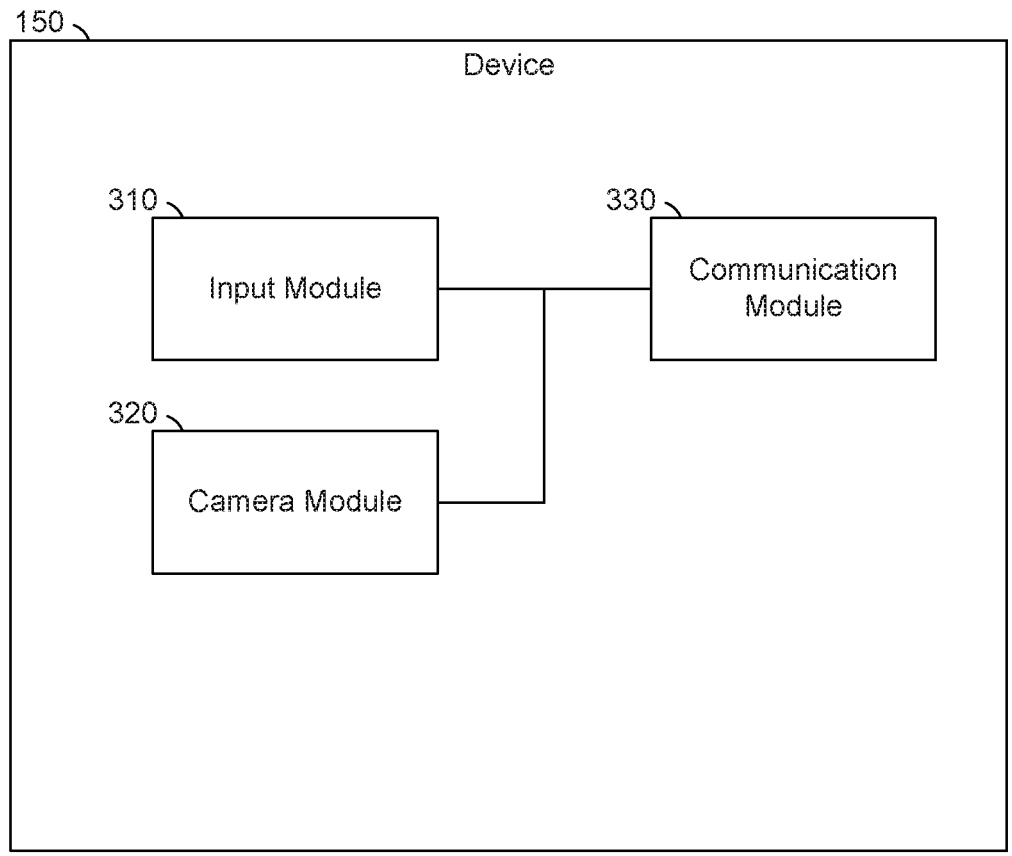
FIG. 3 is a block diagram illustrating components of a device suitable for fine-grained image classification, according to some example embodiments.

FIG. 3 is a block diagram illustrating components of the device 150, according to some example embodiments. The device 150 is shown as including an input module 310, a camera module 320, and a communication module 330, all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input module 310 is configured to receive input from a user via a user interface. For example, the user may enter their username and password into the input module, configure a camera, select an image to use as a basis for a listing or an item search, or any suitable combination thereof.

The camera module 320 is configured to capture image data. For example, an image may be received from a camera, a depth image may be received from an infrared camera, a pair of images may be received from a binocular camera, and so on.

The communication module 330 is configured to communicate data received by the input module 310 or the camera module 320 to the categorization server 130, the e-commerce server 120, or the e-commerce server 140. For example, the input module 310 may receive a selection of an image taken with the camera module 320 and an indication that the image depicts an item the user (e.g., the user 160) wishes to sell. The communication module 330 may transmit the image and the indication to the e-commerce server 120. The e-commerce server 120 may send the image to the categorization server 130 to request categorization of the image, generate a listing template based on the category, and cause the listing template to be presented to the user via the communication module 330 and the input module 310.

Figure 4:
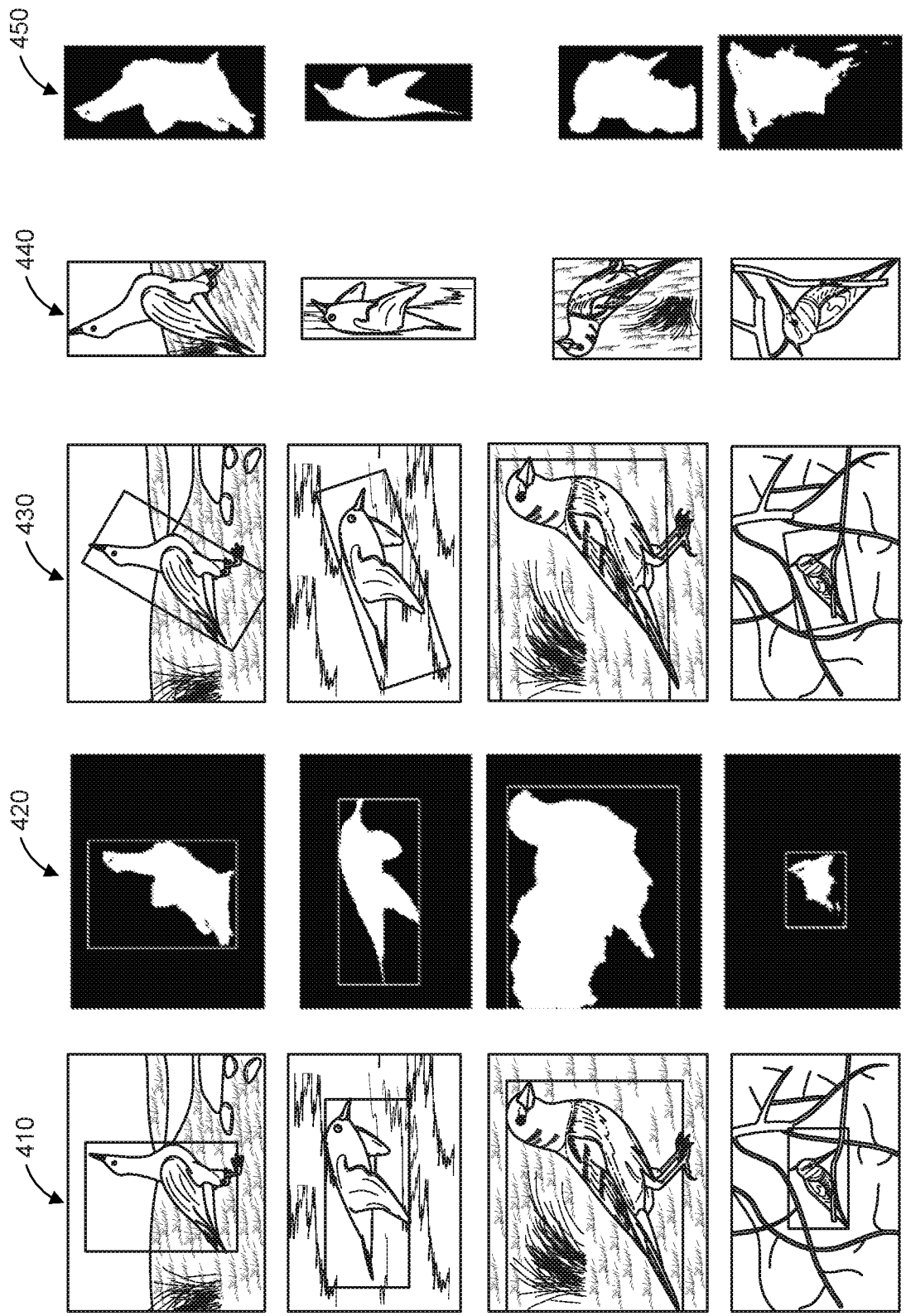
FIG. 4 is a diagram illustrating five steps of image processing suitable for fine-grained image classification, according to some example embodiments.

FIG. 4 is a diagram illustrating five steps of image processing suitable for fine-grained image classification, according to some example embodiments. Column 410 shows four example images of birds, including unaligned bounding boxes. Column 420 shows the grabCut mask for each image. Column 430 shows an aligned bounding box for each image. Column 440 shows the aligned bounding box after rotation and cropping for each image. Column 450 shows the oriented grabCut mask for each image.

Figure 5:
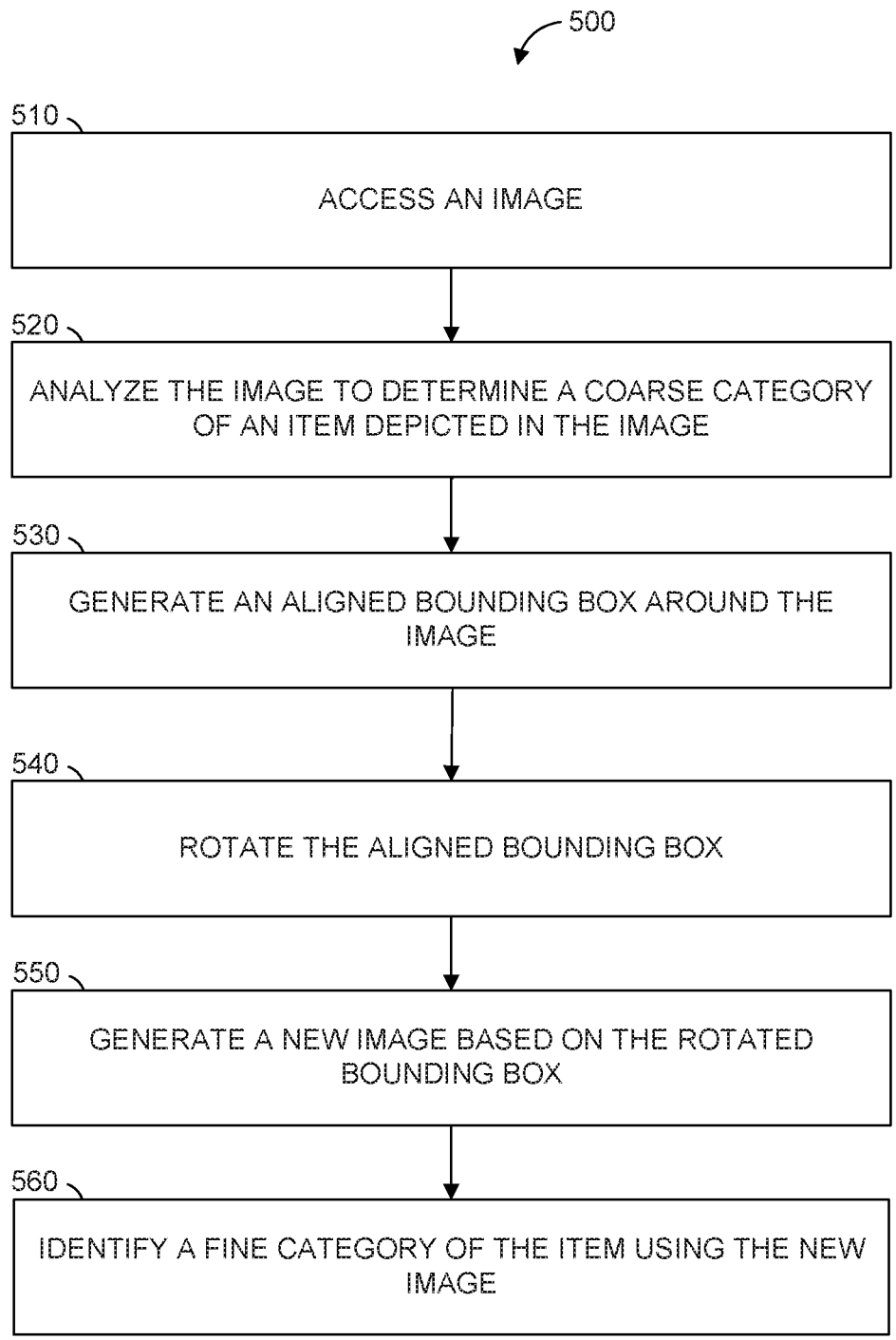
FIG. 5 is a flowchart illustrating operations of a server in performing a process of fine-grained image classification, according to some example embodiments.

FIG. 5 is a flowchart illustrating operations of the categorization server 130 in performing a process 500 of identifying fine categories, according to some example embodiments. The process 500 includes operations 510, 520, 530, 540, 550, and 560. By way of example only and not limitation, the operations 510-560 are described as being performed by the modules 210-270.

In operation 510, the coarse identification module 220 accesses an image and, in operation 520, determines a coarse category of an item depicted in the image. For example, a trained CNN can be used to determine the coarse category.

The alignment module 230, in operation 530, generates an aligned bounding box around the image and, in operation 540, rotates the aligned bounding box. In some example embodiments, a grabCut mask is used to identify the portion of the image that represents the object. Given the foreground mask from grabCut, the convex hull of the mask is located and a rotated rectangle of minimum area that encloses the hull is fitted. The aligned bounding box is rotated and scaled, so that the foreground object is roughly moved to a standard orientation and size. For example, the aligned bounding box may be rotated so that the longer dimension is aligned with the horizontal axis and scaled so that the resulting image is 300 pixels by 200 pixels. The standard orientation and size may be defined globally or be specified for each coarse category.

In some example embodiments, the convex hull is found beginning with the leftmost point of the foreground mask as the first point on the hull. For each potential second point in the foreground mask, the line between the first point and the potential second point is generated and a check made to determine if every other point in the foreground mask is to the right of the generated line. When the check succeeds, the potential second point becomes the second point of the convex hull. The process is continued from the second point to generate a third point and so on until the first point is reached again.

In some example embodiments, the rectangle of minimum area that encloses the convex hull is found by determining, for each edge of the convex hull, the area of the smallest rectangle sharing the edge and encompassing the convex hull. The smallest of those rectangles is the rectangle of minimum area that encloses the hull.

A new image based on the rotated bounding box is generated in operation 550 by the alignment module 230. For example, the portion of the image in the aligned bounding box may be extracted from the input image and saved in a new data structure as part of the rotation process in operation 540.

In operation 560, the fine-grained identification module 240 identifies a fine category based on the new image. For example, a classifier trained using the process 600 can be used to determine the fine category.

Below is a psuedocode listing illustrating operations of a server in performing a process of training a fine-grained image classifier (e.g., the fine-grained identification module 240), according to some example embodiments.

```
Data: T_i: Train Set for Category i ∈ {1, ..., n}
Data: V_i: Validation Set for Category i ∈ {1, ..., n}
Result: D: Top r most discriminative fragment sets
              from each category
for i = [1, ..., n] do
   | F_T_i ⇐ Extract fragments for training set i;
   | F_V_i ⇐ Extract fragments for validation set i;
   | for f ∈ F_T_i do
   |    |  S_f = {f} Initialize the set with the fragment;
   |    |  for t=[1, ..., T] do
   |    |     |  W_f^new ⇐ train lda (S_f);
   |    |     |  S_f^new ⇐ detect add top m (W_f,F_T_i,m);
   |    |  AUC_f ⇐ compute AUC on val(W_f,F_V_i)
   |
D = { } Discovered Discriminative Fragment Sets;
for i = [1, ..., n] do
   | D^new ⇐ Add top r sets with least AUC_f where
   |    f ∈ F_T_i
Return D
```

Training the fine-grained identification module typically requires a training set (e.g., the training sets $T_i$). Most available training sets comprise (image, label) pairs, wherein the depicted object is not aligned in a particular way. To generate additional training images, the images in the training set may be flipped horizontally and assigned the same labels as the corresponding original images. A training set for the fine-grained identification module can be generated from an available training set by performing the steps of the process 500 of identifying the labeled object in the foreground of the image, creating an aligned bounding box, rotating and resizing the bounded portion, and associating the new image with the original label. The identification of the labeled object in the foreground of the image may be performed using selective search, as described in *Selective search for object recognition*, Uijlings et al., IJCV (2013). In one example embodiment, selective search is used using the hue-saturation-value (HSV) color space and the Lab color space and using two similarity measures: ColorTextureSizeFill and TestureSizeFill with parameter k=100. After regions are extracted, any region with a side less than 30 pixels is discarded. In other example embodiments, sliding windows of various sizes are slid over the area of the training image and tested to see if the windows contain the identified foreground object (e.g., using a CNN). The smallest window having the strongest positive recognition for the object is determined to identify the location of the foreground object.

A pre-trained CNN model along with a deep learning tool (e.g., Caffe) may be used to extract deep convolutional features. In one example embodiment, the CNN architecture described in *Imagenet classification with deep convolutional neural networks*, Krizhevsky et al., NIPS (2012), is used. The last layer of 1000 linear classifiers in the Krizhevsky architecture is replaced with a new layer of classifiers, one for each fine category. Each input image is represented as the activations of the fully connected layer fc-6 (4096 dimensions). In order to extract the deep activations, each input image is warped to 256×256 pixels and the central portion of 227×227 pixels is used as the fixed-size input to the first layer. To compensate for the warping and cropping, each input fragment is extracted at a larger height and width proportional to its size such that the final central patch, which is used for feature calculation, exactly corresponds to the originally extracted fragment. In some example embodiments, for fine-tuning, a pre-trained image-net model is used and fine-tuned on the number of fine classes with 500 iterations. Additional example parameters include a base learning rate of 0.001, momentum of 0.9, weight decay of 0.0005, and train-to-validation ratio of 4:1.

For efficiency, the generated set of training images may be refined to reduce the number of images used in training while maintaining the ability of a trained classifier to properly distinguish between fine categories. In one example embodiment, this refinement is addressed by starting from every fragment, iteratively expanding by adding more fragments to achieve generalization, and then picking the most discriminative sets of fragments. In some example embodiments, 5 iterations are used and 10 new fragments are added at each step. Given a set of n categories, for each of the extracted fragments in the training set, a one-vs.-all classifier is trained that discriminates between the category from which the fragment is extracted and all n−1 other categories. The trained model is iteratively refined in the following manner: In each iteration, the model learned in the previous iteration is applied to all the fragments extracted from the same category as the initial fragment. Then, the fragments are sorted based on their confidence of belonging to the same category as the starting fragment and the top m scoring fragments are added as new training samples to the set. Two constraints are enforced: 1) the new fragments added must not currently exist in the training set and 2) each of the new fragments must be from a different image. These constraints ensure that the trained model does not overfit to learning a particular instance of the category in hand and guarantees to increase diversity in each iteration. We continue this process for p iterations, where p is heuristically found. This mining process involves repetitive training to refine the models and is done for each fragment in the training set, as initially all fragments are assumed to be potentially discriminative.

In order to accelerate the learning process, efficient linear discriminant analysis (LDA) training with closed-form updates is used. This training bypasses the need for extensive hard-negative mining. In particular, given a set of n target categories, computing the sample mean $\mu_-$ of the negative examples and sample covariance matrix S of the entire training set needs to be performed only once. For a binary LDA we assume the classes have a shared covariance matrix S, and only need to update $\mu_+$ in each iteration. The resulting LDA classifier for the positive class is obtained as follows: $w \propto S^{-1}(\mu_+ - \mu_-)$.

The most discriminative sets are identified based on an entropy-rank curve. For every set, the final refined model from the last iteration is used to classify the fragments in the validation. The fragments are sorted based on their score, and the k top-ranking blocks are selected. Then the entropy H(Y|k) is computed:

$$H(Y|k) = \sum_{y=1}^{n} p(y|k) \log_2 p(y|k).$$

In this equation, n is the number of target categories and $p(y=y_i|k)$ is the fraction of the top-scoring k fragments that have the label $y_i$. The area under the curve (AUC) of the entropy-rank curves is computed. For an ideal classifier, the entropy starts at zero and remains zero up to a high number of retrieved fragments, and then starts to increase due to the fragments that are returned from classes other than the target class of the group. The fragment sets are sorted based on the AUC in ascending order and the top r groups from each fine category are selected. Accordingly, for a group of n categories, n multiplied by r models are selected, each of which detects a fine-category-sensitive discriminative fragment.

Figure 6:
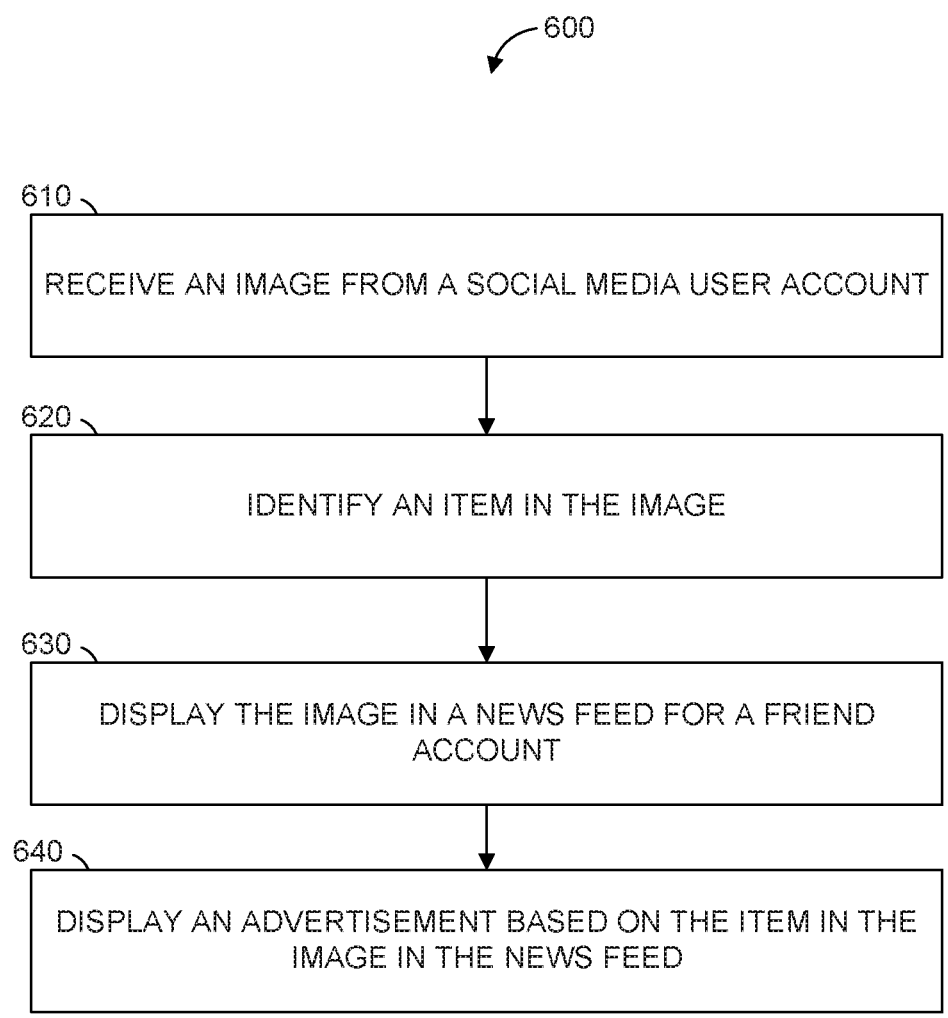
FIG. 6 is a flowchart illustrating operations of a server in performing a process of displaying an advertisement using fine-grained image classification, according to some example embodiments.

FIG. 6 is a flowchart illustrating operations of a server in performing a process 600 of displaying an advertisement using fine-grained image classification, according to some example embodiments. The process 600 includes operations 610, 620, 630, and 640. By way of example only and not limitation, the operations 610-640 are described as being performed by the modules 210-270.

In operation 610, the communication module 210 receives an image from a social media user account. For example, a user may upload an image to be shared with friends, upload an image for public consumption, upload an image to a private photo album, provide a URL to an image hosted elsewhere on the Internet, or any suitable combination thereof.

In operation 620, the fine-grained identification module 240 identifies an item in the image. For example, the fine-grained identification module 240 may determine that the image contains a Honda sedan. The image is displayed in a news feed for an account of a friend of the user in operation 630. In some example embodiments, the display of the image is accomplished by the communication module 210 sending the image to a social media server, which embeds the image in an HTML page sent to a device 150 of the friend. In addition to the image, an advertisement selected based on the contents of the image is displayed in operation 640. For example, based on the determination that the image contains a Honda sedan, an advertisement may be presented for a Honda sedan, another Honda, another car, other car-related products, or any suitable combination thereof.

Figure 7:
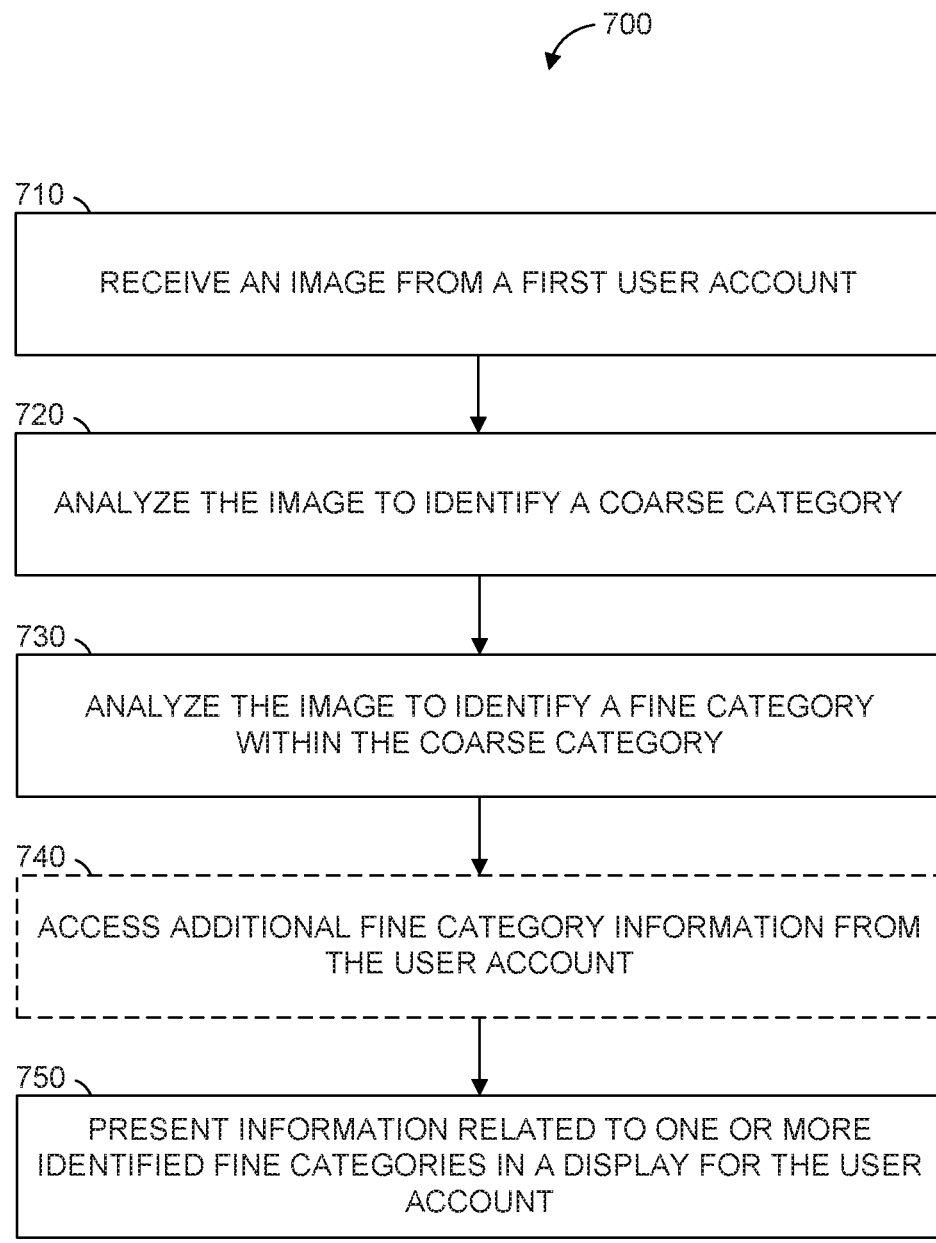
FIG. 7 is a flowchart illustrating operations of a server in performing a process of displaying a search result using fine-grained image classification, according to some example embodiments.

FIG. 7 is a flowchart illustrating operations of the categorization server 130 in performing a process 700 of displaying a search result using fine-grained image classification, according to some example embodiments, according to some example embodiments. The process 700 includes operations 710, 720, 730, 740, and 750. By way of example only and not limitation, the operations 710-750 are described as being performed by the modules 210-270.

In operation 710, the communication module 210 receives an image from a first user account. For example, a user (e.g., the user 160) of a social media service may upload an image (e.g., from the device 150A) to be posted on their wall or outgoing feed. As another example, a user of an e-commerce site may upload an image to be used in part of an item listing for sale. As another example, a user of an e-commerce site may upload an image depicting an item of interest to the user. As yet another example, a user of a general-purpose search engine may upload an image as a complete or partial search query. The user account may be anonymous (e.g., identified by Internet protocol (IP) address only) or associated with a set of data for the user.

The coarse identification module 220 analyzes, in operation 720, the received image to identify a coarse category of an item depicted in the image. Existing methods of coarse identification may be used in operation 720.

In operation 730, the fine-grained identification module 240 analyzes the received image, in light of the identified coarse category, to determine a fine category of the item. For example, operations 530-560 of FIG. 5 may be used to perform operation 730. In some example embodiments, the fine category of the item indicates a plurality of attributes for the item. For example, the coarse category may identify the item as being a particular type of apparel, such as a shoe, skirt, or jacket. The fine category of the item may add additional details, such as color, size, style, length, or brand. Thus, the coarse category of skirt may become the fine category of short red skirt. Similarly, the coarse category of jacket may become the fine category of long brown jacket. As another example, the coarse category of shoe may become the fine category of high-heeled black shoe or brown sandal.

In optional operation 740, information from the user account (e.g., a web page interacting with the user) is used to supplement or replace fine category information determined in operation 730. For example, the fine category for an item may be long brown jacket, but the user may wish to receive information on long black jackets instead. Accordingly, a user interface is presented to the user that indicates the attributes associated with the determined fine category. The user interface is operable by the user to add or modify the attributes. The added attributes may include attributes not determined or not determinable by the fine-grained categorization module 240. For example, the added attributes may include whether an item is new or used, a particular brand of the item, or a precise size of the item.

In operation 750, information related to one or more of the items finely categorized in operation 730 (and optionally operation 740) is presented by the UI module 250 in a display for the first user account. For example, a search engine may cause the display of a set of results that includes results for a text search, the text for the search being the name of the fine category of the item. As another example, an e-commerce site may cause the display of a set of item listings (e.g., listings of items for sale) that match the name, description, or brand of the fine category. In some example embodiments, the information is transmitted from the categorization server 130 or the e-commerce server 120 or 140 over the network 170 to a user device (e.g., device 150A) for presentation to the user.

According to various example embodiments, one or more of the methodologies described herein may facilitate fine categorization of items. Efforts expended by a user in ordering items of interest may also be reduced by one or more of the methodologies described herein. For example, accurately identifying a fine category of an item of interest for a user from an image may reduce the amount of time or effort expended by the user in creating an item listing or finding an item to purchase. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Software Architecture

Figure 8:
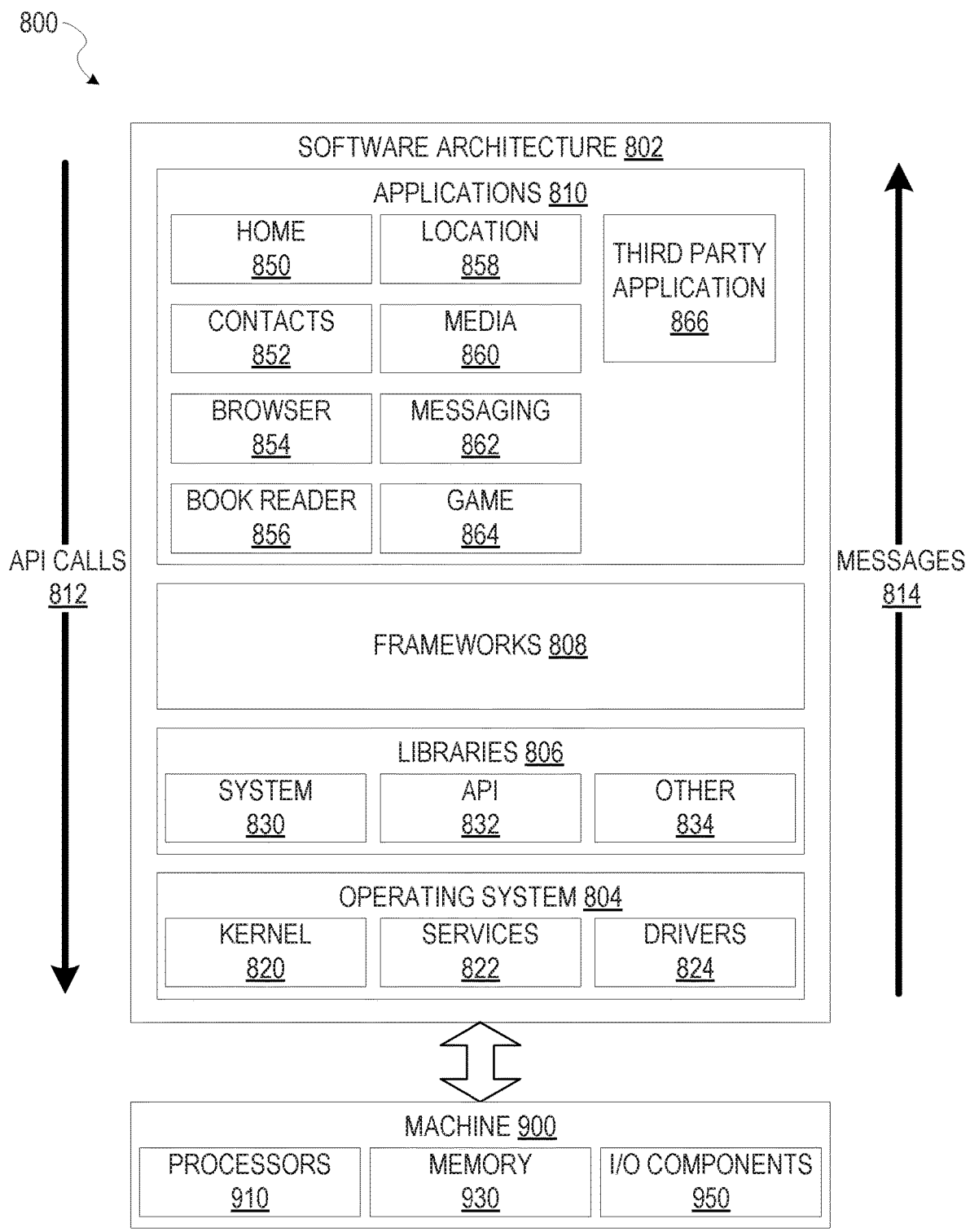
FIG. 8 is a block diagram illustrating an example of a software architecture that may be installed on a machine, according to some example embodiments.

FIG. 8 is a block diagram 800 illustrating an architecture of software 802, which may be installed on any one or more of the devices described above. FIG. 8 is merely a non-limiting example of a software architecture, and it will be appreciated that many other architectures may be implemented to facilitate the functionality described herein. The software 802 may be implemented by hardware such as a machine 900 of FIG. 9 that includes processors 910, memory 930, and I/O components 950. In this example architecture, the software 802 may be conceptualized as a stack of layers where each layer may provide a particular functionality. For example, the software 802 includes layers such as an operating system 804, libraries 806, frameworks 808, and applications 810. Operationally, the applications 810 invoke application programming interface (API) calls 812 through the software stack and receive messages 814 in response to the API calls 812, according to some implementations.

In various implementations, the operating system 804 manages hardware resources and provides common services. The operating system 804 includes, for example, a kernel 820, services 822, and drivers 824. The kernel 820 acts as an abstraction layer between the hardware and the other software layers in some implementations. For example, the kernel 820 provides memory management, processor management (e.g., scheduling), component management, networking, security settings, among other functionality. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 806 provide a low-level common infrastructure that may be utilized by the applications 810. The libraries 806 may include system libraries 830 (e.g., C standard library) that may provide functions such as memory allocation functions, string manipulation functions, mathematic functions, and the like. In addition, the libraries 806 may include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include a wide variety of other libraries 934 to provide many other APIs to the applications 810.

The frameworks 808 provide a high-level common infrastructure that may be utilized by the applications 810, according to some implementations. For example, the frameworks 808 provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third party application 866. According to some embodiments, the applications 810 are programs that execute functions defined in the programs. Various programming languages may be employed to create one or more of the applications 810, structured in a variety of manners, such as object-orientated programming languages (e.g., Objective-C, Java, or C++) or procedural programming languages (e.g., C or assembly language). In a specific example, the third party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 812 provided by the mobile operating system 804 to facilitate functionality described herein.

Example Machine Architecture and Machine-Readable Medium

Figure 9:
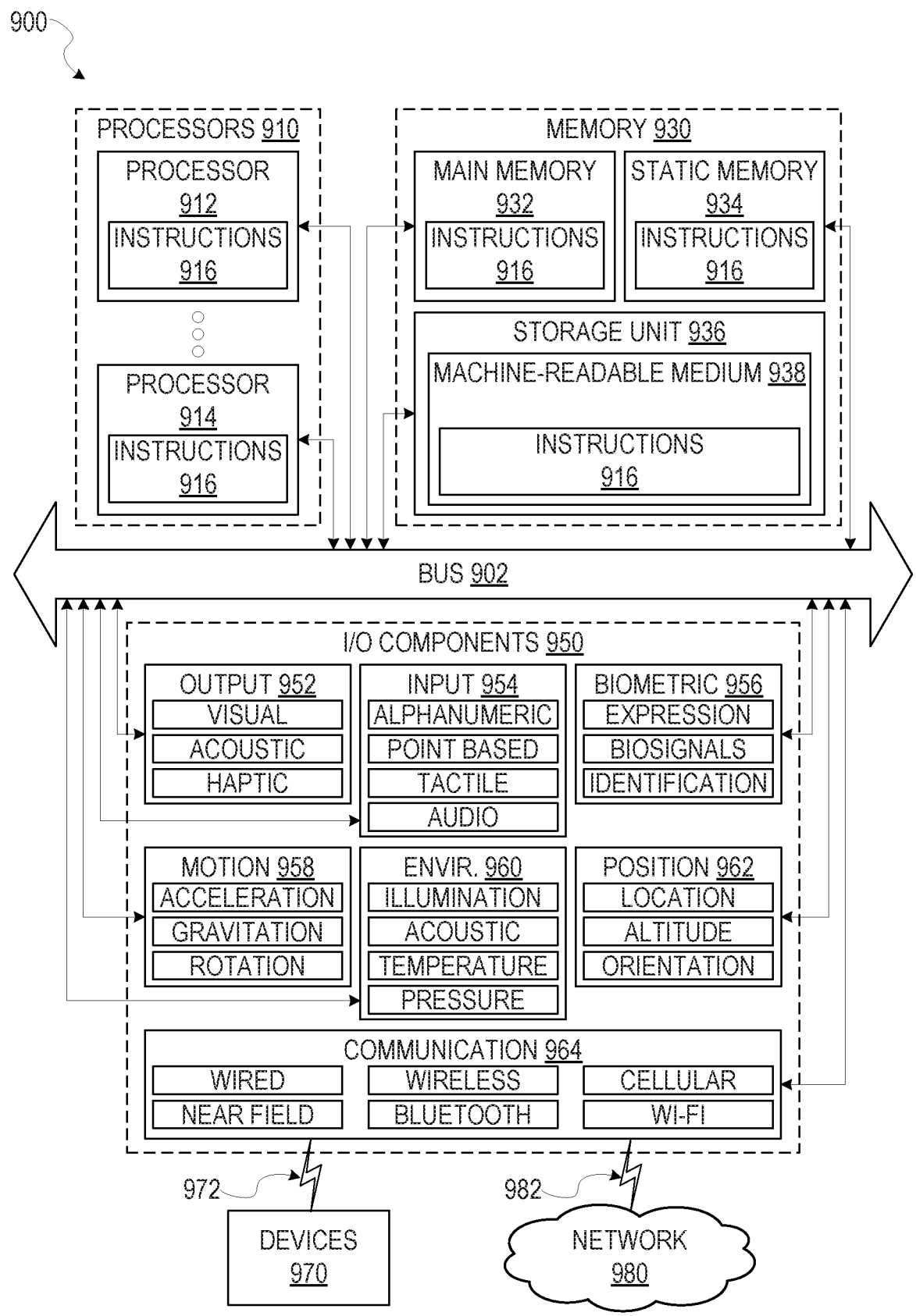
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (also referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936 accessible to the processors 910 via the bus 902. The storage unit 936 may include a machine-readable medium 938 on which are stored the instructions 916 embodying any one or more of the methodologies or functions described herein. The instructions 916 may also reside, completely or at least partially, within the main memory 932, within the static memory 934, within at least one of the processors 910 (e.g., within the processor's cache memory), or any suitable combination thereof, during execution thereof by the machine 900. Accordingly, in various implementations, the main memory 932, the static memory 934, and the processors 910 are considered as machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962 among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, Near Field Communication (NFC) components, Bluetooth® components (e.g., Bluetooth® Low Energy), Wi-Fir components, and other communication components to provide communication via other modalities. The devices 970 may be another machine or any of a wide variety of peripheral devices (e.g., a peripheral device coupled via a USB).

Moreover, in some implementations, the communication components 964 detect identifiers or include components operable to detect identifiers. For example, the communication components 964 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., HTTP). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 as "non-transitory" should not be construed to mean that the medium is incapable of movement; the medium should be considered as being transportable from one physical location to another. Additionally, since the machine-readable medium 938 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
accessing an image;
identifying, using one or more hardware processors, an object in the image, the identified object being associated with a coarse category;
based on the coarse category, analyzing the image to identify a fine category; and
causing presentation of information related to the identified fine category.

2. The method of claim 1, further comprising:
determining a bounding box that encompasses the object in the image.

3. The method of claim 1, further comprising:
performing a search for the information related to the identified fine category.

4. The method of claim 1, wherein the fine category is a sub-category of the coarse category.

5. The method of claim 1, wherein the fine category is identifiable by a name.

6. The method of claim 1, further comprising:
rotating at least a portion of the image based on orientation.

7. The method of claim 1, wherein the fine category is identified from a set of available fine categories for the coarse category.

8. A system comprising:
one or more hardware processors; and
a storage medium storing instructions that; when executed by the one or more hardware processors, causes the one or more hardware processors to perform operations comprising:
accessing an image;
identifying an object in the image, the identified object being associated with a coarse category;
based on the coarse category, analyzing the image to identify a fine category; and
causing presentation of information related to the identified fine category.

9. The system of claim 8, wherein the operations further comprise:
determining a bounding box that encompasses the object in the image.

10. The system of claim 8, wherein the operations further comprise:
performing a search for the information related to the identified fine category.

11. The system of claim 8, wherein the fine category is a sub-category of the coarse category.

12. The system of claim 8, wherein the fine category is identifiable by a name.

13. The system of claim 8, wherein the operations further comprise:
rotating at least a portion of the image based on orientation.

14. The system of claim 8, wherein the fine category is identified from a set of available fine categories for the coarse category.

15. A machine-readable storage device storing instructions that, when executed by one or more processors of a machine, cause the machine to perform operations comprising:
accessing an image;
identifying an object in the image, the identified object being associated with a coarse category;
based on the coarse category, analyzing the image to identify a fine category; and
causing presentation of information related to the identified fine category.

16. The machine-readable storage device of claim 15, wherein the operations further comprise:
determining a bounding box that encompasses the object in the image.

17. The machine-readable storage device of claim 15, wherein the operations further comprise:
performing a search for the information related to the identified fine category.

18. The machine-readable storage device of claim 15, wherein the fine category is a sub-category of the coarse category.

19. The machine-readable storage device of claim 15, wherein the fine category is identifiable by a name.

20. The machine-readable storage device of claim 15, wherein the operations further comprise:
rotating at least a portion of the image based on orientation.

* * * * *